Nov. 13, 1956  K. W. JAY  2,770,245
GRAVITY-CONTROLLED VALVES FOR CONTINUOUS LIQUID SUPPLY TANKS
Filed Sept. 7, 1955  2 Sheets-Sheet 1

INVENTOR
KENNETH W. JAY
BY
Maybee & Legris
ATTORNEYS

Nov. 13, 1956 K. W. JAY 2,770,245
GRAVITY-CONTROLLED VALVES FOR CONTINUOUS LIQUID SUPPLY TANKS
Filed Sept. 7, 1955 2 Sheets-Sheet 2
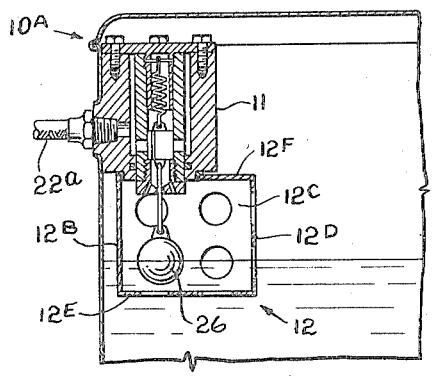
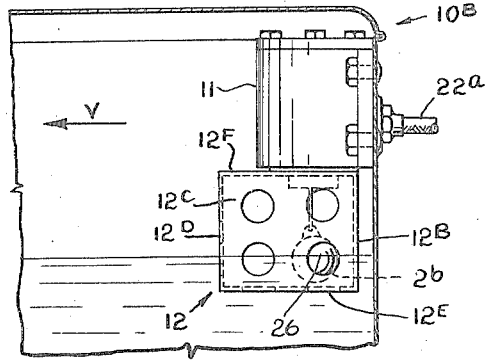
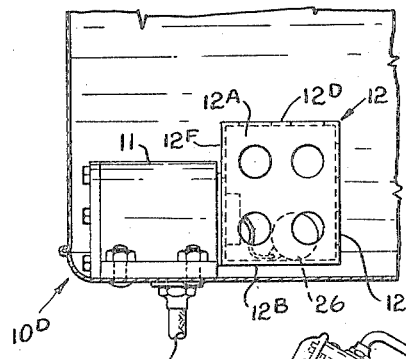
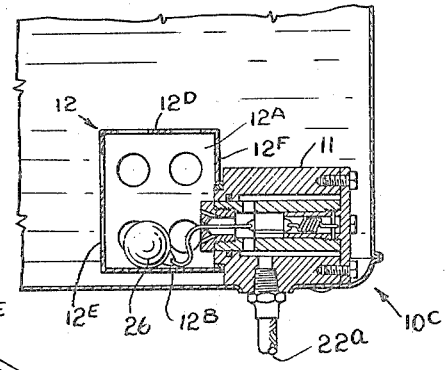
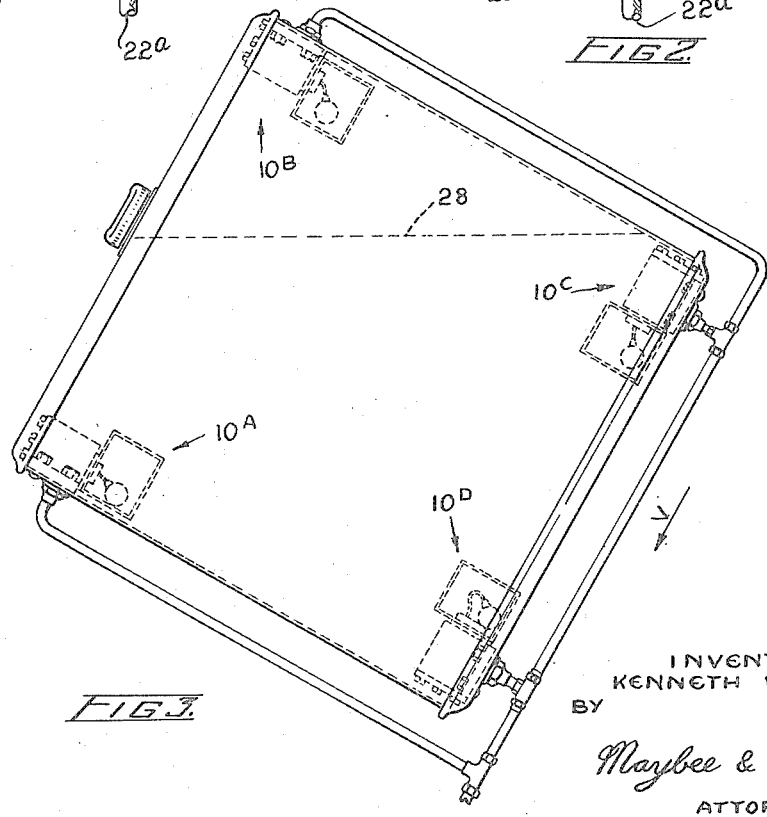
INVENTOR
KENNETH W. JAY
BY
Maybee & Legris
ATTORNEYS.

United States Patent Office 2,770,245
Patented Nov. 13, 1956

2,770,245

GRAVITY-CONTROLLED VALVES FOR CONTINUOUS LIQUID SUPPLY TANKS

Kenneth William Jay, North York, Ontario, Canada, assignor to Orenda Engines Limited, Malton, Ontario, Canada, a corporation Application September 7, 1955, Serial No. 532,975

3 Claims. (Cl. 137—38)

This invention relates to outlet valves that open and close in response to changes in position relative to gravity-direction, for a tank that must be able to supply liquid continuously when it is in any position with respect to the vertical.

The general object of the invention is to provide a better type of outlet valve for liquid-supplying tanks that may be tilted or turned over, and must still supply liquid and not air or a mixture of liquid and air. This type of tank may be needed to deliver fuel or lubricating oil in aircraft.

A specific object of the invention is to provide a simple mechanical type of gravity-responsive regulation in valves for this kind of tank, to ensure that the valves will tend to operate reliably under all conditions of operation.

These objects are attained by the embodiment of the invention disclosed in the following description and the accompanying drawings, which are of a valve that is suitable for a lubricating oil supply tank for aircraft.

In the drawings—in which each reference character indicates the same part in all the views—

Fig. 2 is a vertical sectional view of a tank showing the valves in four corners of the tank.

Fig. 3 is a view like Fig. 2 but with the scale reduced and showing the tank tipped forward in the position of an aircraft diving.

Figure 1:
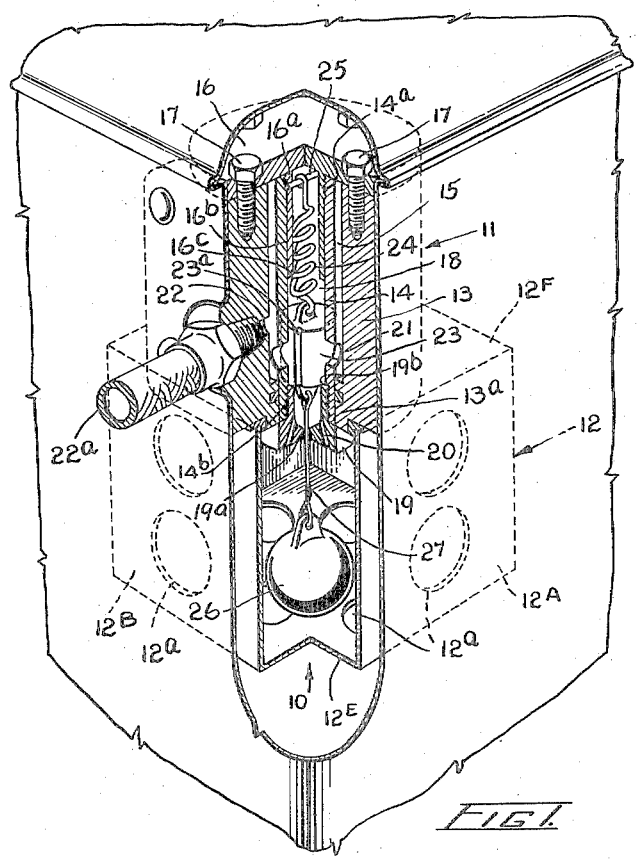
Fig. 1 is fragmentary perspective view of a valve according to the invention mounted in one corner of an aircraft oil tank, the drawing showing some of the parts in section.

A tank according to the invention has several valves rigidly secured within it. But all of them operate in about the same way and a typical valve construction according to the invention will be described first.

Each valve 10 comprises a valve body 11 and a perforated valve-regulating chamber 12. The main parts of the body 11 consists of a hollow outer cylinder 13 and a hollow inner cylinder 14 disposed within the outer cylinder, with an annular flow chamber 15 between them.

The inner cylinder has internal threads 14$^a$ and 14$^b$ at the upper and lower ends, respectively, and its lower end is fitted inside a reduced-inner-diameter part 13$^a$ of the outer cylinder 13. It is secured in place by a flanged cap 16 that is bolted by means of bolts 17 to the outer cylinder 13, and that has a threaded tubular boss 16$^a$. The boss screws into the thread 14$^a$ of the inner cylinder to secure it to the cap.

The tubular boss has a tubular extension 16$^b$ which reduces the inner diameter of the inner cylinder 14 for about half its length. Its end forms an annular stop 16$^c$ in the inner cylinder bore 18.

A cylinder head 19 having a central guide opening 19$^a$ is screwed into the thread 14$^b$ at the lower end of the inner cylinder to partially close the end opening. The upper end of the head 19 provides another annular stop 19$^b$ in the wall of cylinder bore 18. Inlet ports 20 leading into the cylinder bore 18 are angularly disposed in the cylinder head 19. Further up, outlet ports 21 lead out of the cylinder bore through the wall of the inner cylinder 14 and the outer cylinder 13 has a main outlet port 22 which leads into an outlet line 22$^a$. A flow-path for liquid is thus provided through the inlet ports 20, the cylinder bore 18, the outlet ports 21, the annular chamber 15, the main outlet port 22 and the outlet line 22$^a$.

To control the flow through these passages there is a piston 23 in the piston bore 18. It is urged toward the stop 16$^c$ by means of a spring 24 stretched between one end of the piston and a rod 25 spanning the hollow boss 16$^a$. A balancing passage 23$^a$ extends through the piston to equalize the pressures at its ends.

A weight in the form of a ball 26 is suspended from the end of the piston by a flexible connector 27, which passes through the guide opening 19$^a$ and may be a natural or synthetic fibre cord or metal or plastic strand that will not be damaged by the liquid in the tank. The central guide opening 19$^a$ of the cylinder head 19 preferably has a smoothly rounded, bell-shaped edge to reduce wear on the connector. The weight must be large enough to move the piston downward in opposition to the urging of the spring when the ball is hanging free. In this position the piston rests on the stop 19$^b$ at the upper end of the cylinder head 19 and its side wall closes the outlet ports 21 against flow of liquid from the ports 20.

The valve regulating chamber 12 has side walls 12A, B, C, D, a bottom wall 12E and a top wall 12F, disposed in the relative position of the inner surfaces of a hollow cube. The top wall includes the exposed end of the cylinder head 19. Holes 12$^a$ in the walls admit the fuel in the tank, to permit the fuel to occupy the space in the chamber.

If the ball is supported externally, and its weight removed from the piston, the strength of the spring 24 is such that it will pull the piston against stop 16$^c$ and free of the outlet ports 21, thus allowing flow of the liquid to the line 22$^a$. To support the ball thus, in certain positions of the tank, is the purpose of the valve regulating chamber 12. It is shaped to support the ball on two of its adjacent walls, 12A and 12B, when the valve is in a position in which either of these two walls is underneath the bell-shaped mouth 19$^b$. (In Fig. 1 of course the valve is shown in a position in which neither of the walls supports the ball).

The other two side walls 12C and 12D and the bottom wall 12E are spaced sufficiently far from the mouth to allow the ball to hang free. When one of these walls is underneath the bell-shaped mouth 19$^b$, as in Fig. 1, the piston is pulled down to close the outlet ports, as shown in Fig. 1.

Fig. 2 shows four of the valves 10A, B, C, D, in a tank that is upright, representing the level flight position. Arrow V shows the direction of flight. Both upper valves 10A and 10B have the ball 26 hanging free above side 12E (as in Fig. 1); the lower valves have the ball supported by wall 12B.

When the valve body is fully inverted, it is obvious that the ball will be supported by cylinder head 19 itself, which is adjacent to both of the supporting walls 12A and 12B, and which provides a sixth wall of the chamber and a third supporting wall. This is shown in valve 10D in Fig. 3, which shows the tank tilted by a dive; the direction of flight is again shown by arrow V. Valves 10A and 10D are open to allow fuel to flow; valves 10B and 10C, above the level of oil 28, are closed.

In some aircraft applications, it may be sufficient to provide four valves only, 10D and 10C on the bottom (10D near the front face and 10C near the rear face), and 10A and 10B located near the top of each of the front and rear faces, as shown in Figs. 2 and 3 ("front"

and "rear" being taken with respect to the direction of flight). This will accommodate fore and aft tilting (dive and climb) and inverted flight. Side tilting will normally only occur temporarily on turns, in which it will be accompanied by G-forces tending to hold the liquid in its level flight position.

Figure 4:
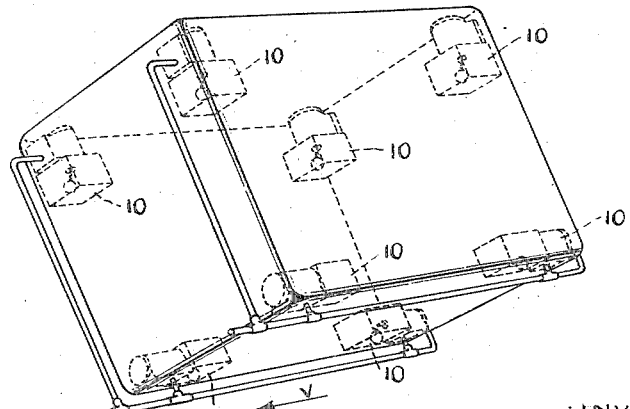
Fig. 4 is a perspective view taken from below of a tank having the valves in all eight corners.

In other applications, where side tilting must be provided for, there may be one valve near each of the eight corners of a tank that is rectangular in horizontal and vertical section. A suitable arrangement for such an aircraft fuel tank is shown in Fig. 4 in which the arrow V again represents the direction of flight of the aircraft. Two valves are arranged on the front face and two on the rear face of the tank and four valves are arranged on the bottom, one near each corner.

The foregoing description sets forth the best mode contemplated by the inventor of carrying out his invention, but the following claims are intended to cover all useful changes and modifications of the said mode which are within the scope of the invention.

What I claim as my invention is:

1. A gravity-controlled valve for a tank that must be able to supply liquid continuously when it is in any position with respect to the vertical, comprising a casing enclosing a passage for liquid, a flow-controlling member reciprocatable in the casing and movable one way to open the passage and another way to close the passage, resilient means connected to the said member and exerting a force on it urging it one of the said ways, a flexible connector with one end attached to the said member, guide means connected to the casing and aligning a part of the connector near the said member in the same general direction as the said reciprocation, a weight attached to the other end of the connector, the weight being greater than the said force and supported by the said member through the connector when the casing is in one position with respect to the vertical to urge the said member in the other of the said ways, the weight being swingable on the flexible connector in an arc around the said guide means, and a surface rigidly connected to the said casing within the radius of the said arc to support the weight against gravity when the casing is in another position with respect to the vertical to allow the resilient means to urge the said member in the first mentioned way.

2. A gravity-controlled valve for a tank that must be able to supply liquid continuously when it is in any position with respect to the vertical, comprising a casing enclosing a cylinder bore, inlet and outlet openings in the casing, a piston reciprocatable in the cylinder bore and movable one way to close one of the said openings and another way to open it, a spring connected to one end of the piston and urging it one of the said ways, a flexible connector with one end attached to the other end of the piston, the end of the cylinder more near the end of the piston to which the connector is attached, having a guide opening through which the connector extends, a weight attached to the other end of the connector, the weight being greater than the strength of the spring and being supported by the piston through the connector when the casing is in one position with respect to the vertical to urge the piston in the other of the said ways, the weight being swingable on the flexible connector in an arc around the guide opening, and a member providing a surface rigidly connected to the said casing and lying within the radius of the said arc to support the weight against gravity when the casing is in another position with respect to the vertical to allow the spring to urge the said member in the first mentioned way.

3. A gravity-controlled valve for a tank that must be able to supply liquid continuously when it is in any position with respect to the vertical, comprising a casing enclosing a cylinder bore, an inlet opening at one end of the cylinder bore, an outlet opening in the side wall of the cylinder bore, a piston reciprocatable in the cylinder bore in one sense to cover the outlet opening and in the other sense to uncover it, a spring connected to one end of the piston urging it in the last mentioned sense, a guide opening in the inlet end of the cylinder bore, a flexible connector with one end attached to the other end of the piston and extending through the guide opening, a weight attached to the other end of the connector, the weight being greater than the strength of the spring and being supported by the piston through the connector when the weight is hanging free to urge the piston in one of the said senses, the weight being swingable on the flexible connector in an arc around the guide opening, and a member rigidly connected to the said casing and providing three surfaces disposed generally in the relative positions of three adjacent inner walls of a hollow cube, three of the said walls being within the radius of the said arc to support the weight against gravity when the casing is in such positions with respect to the vertical that one of the said supporting walls is beneath the guide opening to allow the spring to urge the said member in the other of the said senses, one of said walls being provided by the end of the casing.

References Cited in the file of this patent

UNITED STATES PATENTS

| 387,960 | Poole | Aug. 14, 1888 |
| 406,290 | Murdock | July 2, 1889 |